Patented May 9, 1950

2,507,413

UNITED STATES PATENT OFFICE 2,507,413

ORGANO SILICON ELASTOMERS

Charles A. MacKenzie, East Orange, N. J., assignor, by direct and mesne assignments, of one-half to Montclair Research Corporation, a corporation of New Jersey, and one-half to Ellis-Foster Company, a corporation of New Jersey No Drawing. Application January 17, 1946, Serial No. 641,878

24 Claims. (Cl. 260—46.5)

This invention relates to the production of elastomers or rubber-like materials from organo silicon derivatives, to the products themselves, to methods of making such products, and to their treatment and utilization.

Among the objects of the present invention is the production of elastomers or rubber-like materials from organo silicon derivatives by simple and economic procedures.

Other objects include the production of products and materials having entirely novel characteristics.

Still further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In accordance with the present invention, elastomeric materials are produced from organo silicon derivatives, particularly what may be designated as silicochloroform derivatives. Such derivatives are characterized by the presence of a hydrogen-silicon bond in the molecule and may be generally formulated as $R_y SiHX_{3-y}$, where R is an organic group more particularly aliphatic, carbocyclic, or nonaromatic carbocyclic, X is a halogen particularly selected from chlorine, bromine and iodine, and $y$ is 1 or 2. Compounds of this type are utilized because they are hydrolyzable, and on hydrolysis to remove halogen there are obtained compounds containing hydroxyl groups, or oxide groups, or mixtures thereof and, of course, they may be complex due to partial polymerization, etc. Illustrated by the chlorine containing derivatives, such compounds may be generally formulated as $RSiHCl_2$ or $RR'SiHCl$, where R and R' have the significance indicated above in the more general formula. Any hydrolyzable compounds of the character characterized above may be utilized in carrying out the present invention.

In the nomenclature used hereinafter with respect to these derivatives, they will be referred to as silico-chloroform derivatives. While nomenclature based on the silane group can be used, as for example, ethyl dichloro silane, $C_2H_5SiHCl_2$, in accordance with the terminology used herein, such derivatives will be referred to as ethyl silicochloroform.

The organo substituent groups in the silicochloroform derivatives referred to above may be illustrated by alkyl, alphyl, aryl, alkynyl, alkenyl, aralkyl, alkanyl, olefinyl, and non-aromatic carbocyclic groups and the like, illustrated by methyl, ethyl, propyl, butyl, amyl, hexyl, heptyl, octyl, vinyl, allyl, butenyl, cyclohexyl, benzyl, phenyl, tolyl, xenyl, chlorphenyl, styryl, radicals from acetylene, methyl acetylene, propyl acetylene, phenyl acetylene, and the like.

The production of elastomeric products from such derivatives will be illustrated below by specific examples using mono-methyl dichlorosilane, mono-ethyl dichlorosilane, mono-butyl dichlorosilane, dimethyl monochlorosilane, mono-n-propyl dichlorosilane, di-n-butylsilicochloroform, mono-phenyl dichlorosilane, diphenyl monochlorosilane, mono-benzyl dichlorosilane, and copolymeric derivatives produced from any of these stated silicochloroform derivatives in the production of copolymerization products with other hydrolyzable organo silicon halides which do not contain a hydrogen-silicon bond. While such examples will illustrate the production of the desired products from individual derivatives and also mixtures of derivatives, it should be pointed out that mixtures of the various hydrolyzable silicochloroform derivatives as exemplified above may be utilized where there are two or more such silicochloroform derivatives present, either with or without one or more of the hydrolyzable organo silicon halides having no hydrogen-silicon bonds.

The organo silicochloroform derivative or mixture containing the same employed, are subjected to hydrolysis by any convenient means, to remove the halogen such as chlorine, either in whole or in part, and substitute hydroxyl groups, or the oxide grouping, or mixtures of such derivatives in various combinations. The hydroylsis step may be carried out in any desired way, as for example, where the silicochloroform derivative or mixtures containing it as set forth above, in ether solution are poured on ice, the water separated from the hydrolyzed product, and the latter dried. When carried out in the presence of a solvent such as ether, the ether may then be evaporated from the product. Such procedure is merely exemplary of the hydrolysis step that can be employed to produce the hydrolyzed silicochloroform derivative or composition containing such hydrolyzed derivative. The hydrolyzed materials are then subjected to heat and to blowing with air desirably the heat treatment and blowing with air being carried out simultaneously, to aid in the polymerization. At this stage the polymerization may be carried to a point where an extremely viscous liquid or gel-like solid is obtained. The temperatures used in this blowing operation and the length of the time treatment may be adjusted to produce the type of product desired. Generally such temperatures are preferably from about 150 to 250° C. for time periods that vary from 10 minutes to 6 hours; the temperature of treatment and the length of time treatment varying with the particular types of derivatives undergoing polymerization as well as the degree of polymerization desired. The blowing operation need not be carried out at a single range of temperature, but successive stages of temperature treatment varying between such stages may be employed for varying periods at different temperatures, as for example, where the blowing operation is carried out in several steps, with different temperatures employed in the several steps desirably utilizing higher temperatures in the later stages of treatment and there may be two or more such stages of different temperature treatments depending on the nature of the product undergoing treatment, and the ultimate polymerization product desired at this stage. Similarly the time treatment where multi-temperature stage processes are employed may vary depending on the characteristics and the product sought from the particular material undergoing treatment. Temperatures of the order set forth above which produce the stated polymerization are referred to hereinafter as elevated temperatures.

The polymerization or partial polymerization product obtained at this stage may then be subjected to treatment in various ways. Thus it may be milled on regular rubber milling equipment or it may be subjected to further treatment by heat to produce further polymerization or combinations of the heat treatment and milling operations may be utilized either simultaneously or successively.

Various fillers may if desired be incorporated at this stage as well as various antioxidants. As exemplary of the fillers there may be mentioned such fillers as zinc oxide, carbon black, titanium oxide, magnesia, alumina, magnesium carbonate and the like; and of course, combination of fillers may be employed where desired. As antioxidants any of the usual antioxidants may be employed including particularly the aromatic amines and phenols and their various derivatives employed as antioxidants.

The material either filled or unfilled, may be worked on the rolls until a suitable workable mass is obtained. This mass may then be cut, stamped, shaped or otherwise treated to particular dimensions and subjected to further curing by heat treatment, as for example, at temperatures ranging from 100 to 250° C., the time of such treatment varying with the particular properties it is desired to develop in the material. By such treatments, rubbery materials are readily obtained possessing varying degrees of rubberiness and resilience. Articles ranging from hard rubbers to soft rubbers may be produced in this way.

As indicated above, the silicochloroform derivatives may be subjected to the treatment indicated above, either alone or in mixture with any of the various silicochloroform derivatives mentioned, and various combinations may be utilized, and also such materials may be copolymerized with organo silicon derivatives which contain no hydrogen-silicon bond, particularly the organo silicon halides, such as the organo silicon chlorides which contain no hydrogen-silicon bond. Such organo substituents in these copolymerizing ingredients may be any of the various aliphatic, aromatic, and carbocyclic non-aromatic groups as indicated above. And in both types of compounds whether the silicochloroform derivative or the capolymerizing material present, there may be different aryl, alkyl, or mixed organo groups, or they may all be the same depending on the characteristics which it is sought to develop. When the silicochloroform derivatives are copolymerized with other hydrolyzable organo silicon halides, the ratios of one type of material to the other may be adjusted to control the properties sought but it is most desirable to have the silicochloroform derivative as the main constituent. The rubbery characteristics, hardness, elongation, and workability, as well as heat resistance and various other properties may be controlled in these derivatives by the type of organo substituent groups present, as for example, by the number of alkyl substituents and the degree of polymerization or aeration.

In the production of the copolymeric materials as indicated above, various procedures may be utilized. Thus cohydrolysis of a mixture of the desired halides such as chlorides may be employed followed by polymerization by the treatment set forth or polymerization of a mixture of hydrolytic products formed separately may be carried out or mixtures of polymerization products from the several derivatives may be produced by the milling operations, etc. Copolymerization products may thus be produced by desired method and the characteristics controlled in a manner analogous to that set forth above.

The blowing or aeration has been referred to above using air. Such aeration may be carried out in other ways as by the use of oxygen either alone or admixed with an inert gaseous diluent. When air is used, the nitrogen present acts as a diluent. Other mixtures of oxygen and an inert diluent such as nitrogen may be used in proportions different from that of air. The action of the oxygen may thus be controlled by the amount of nitrogen used. Any inert gaseous diluent may be employed including a gas or mixture of gases inert toward oxygen and the silicon materials under the conditions employed.

In the following examples which illustrate the invention, the parts are by weight unless otherwise indicated.

*Example 1.*—This example illustrates the polymerization, by means of heat and air, of hydrolyzed mono-methyl dichlorosilane.

A rapid stream of dry air was passed through hydrolyzed mono-methyl dichlorosilane held at 150–160° C. After one hour and fifteen minutes a sample was withdrawn. The sample had a viscosity value of approximately 50 centipoises at 25° C. The sample was dissolved in toluene and a film was poured on glass. When the tacky film was heated at 150° C. for four hours a hard, clear film was obtained free of tack.

The aeration of the major portion of the material was continued at 150–160° C. for another 10 minutes making the total time of aeration one hour and twenty-five minutes. The product at this stage was still pourable but when it was put into a beaker it chagned to a soft, insoluble gel within 10 minutes. The somewhat sticky gel was spread out and placed in an oven at 120° C. for one hour. A soft, millable material was obtained which was rolled into the shape of a ball. When the ball was heated at 120° C. for 4 hours it developed pronounced rubbery qualities, particularly from the standpoint of resilience.

*Example 2.*—This example illustrates the polymerization, by means of heat and air, of hydrolyzed mono-ethyl dichlorosilane.

Hydrolyzed mono-ethyl dichlorosilane was aerated for two and one-half hours at 155–160° C. The sample at this point was very viscous and, after pouring, rapidly set to a firm gel. A portion of the product was milled on a rubber mill and formed into a ball and placed in the oven at 120° C. Within a period of one hour the ball developed pronounced resiliency.

When the above described gel set overnight it became crumbly and would not mill readily. It was found possible to mill it on a rubber mill very satisfactorily when it was mixed with a small quantity of hydrolyzed, unheated non-aerated, mono-ethyl dichlorosilane. When the product obtained by this process was heated at 120° C. for five hours a very smooth, resilient material was formed. After less than one hour's heating at 120° C. the product was distinctly rubbery.

In the aeration procedure described above a sample was withdrawn shortly before the end of the heating period and while the product was still solvent soluble. The sample was dissolved in toluene and a film was then poured on a glass plate. When the plate was heated at 150–160° C. for five hours a clear, hard film was obtained.

*Example 3.*—This example illustrates the polymerization, by means of heat and air, of a mixture of hydrolyzed mono-methyl dichlorosilane and hydrolyzed mono-ethyl dichlorosilane.

A mixture was made of 5 parts each of hydrolyzed mono-methyl dichlorosilane and hydrolyzed mono-ethyl dichlorosilane. The mixture was aerated at 190° C. for thirty minutes. At this point the sample gelled. The gel was easily milled in a rubber mill and formed into the shape of a ball. After heating the ball for several hours at 120° C. a very resilient product was obtained.

*Example 4.*—This example illustrates the polymerization, by means of heat and air, of hydrolyzed mono-butyl dichlorosilane.

Hydrolyzed mono-butyl dichlorosilane was aerated at 155–160° C. for 2¼ hours. The material was very viscous at this point and set to a soft gel when poured. A portion of the gel was spread out on a watch glass and placed in the oven at 120° C. for one hour. The product lost most of its stickiness at this point and was easily formed into the shape of a ball. The ball was heated at 120° C. for three hours. After this treatment the ball had pronounced rubber-like qualities.

A sample of the product was withdrawn from the aeration vessel just before the end of the heating period and while the sample was still soluble in solvents. A toluene solution of it was made and poured on a glass plate. When the plate was heated 170–180° C. for six hours, a clear, hard film was obtained.

*Example 5.*—This example illustrates the polymerization, by means of heat and air, of a mixture of hydrolyzed mono-methyl dichlorosilane and hydrolyzed mono-ethyl dichlorosilane.

Five parts each of the above materials were mixed and aerated at 155–160° C. When the product became quite viscous a sample was withdrawn, dissolved in toluene and poured on a glass palte. When the plate was heated at 140–150° C. for six hours a clear hard film was obtained. The original mixture was aerated for a period of one hour. It was poured into a beaker and within a few minutes it changed to a gel. A portion of the gel was spread on a watch glass and heated at 120° C. for one-half hour. It was then milled into a ball and heated at 120° C. for four hours. A very resilient product was obtained in this way.

*Example 6.*—This example illustrates the polymerization, by means of heat and air, of a mixture of hydrolyzed mono-methyl dichlorosilane and hydrolyzed butyl silicon trichloride.

A product composed of 7.5 parts of hydrolyzed mono-methyl dichlorosilane and 2.5 parts of hydrolyzed butyl silicon trichloride, was aerated at 160° C. for 20 minutes. The mixture was poured into a beaker in which it gelled within a few minutes. A small sample was placed on a watch glass in the oven at 120° C. for 20 minutes. It was then rolled into a small ball and heated at 120° C. for an additional five hours. At this point the product was soft and resilient.

*Example 7.*—This example illustrates the polymerization, by means of heat and air, of hydrolyzed mono-phenyl dichlorosilane.

Hydrolyzed mono-phenyl dichlorosilane was aerated at 155–160° C. for six hours without a very appreciable change taking place. The temperature was raised to 190–200° C. for three hours and then to 250° C. for one hour. A very viscous material was obtained which was still soluble in toluene. A film of the product was poured on a glass plate and heated at 200° C. for 2 hours; a hard, clear film was obtained.

*Example 8.*—This example illustrates the polymerization, by means of heat and air, of a product obtained by hydrolyzing a mixture of butyl trichlorosilane and mono-phenyl dichlorosilane.

A hydrolytic product was prepared from a mixture of butyl trichlorosilane (3.0 parts) and mono-phenyl dichlorosilane (5.0 parts). The hydrolysis product was aerated at 160° C. for 10 minutes at which time it gelled.

A portion of the gel was milled with titanium dioxide and shaped into the form of a ball. The ball was heated at 100° C. for 17 hours; at this stage it was soft and could be pressed flat with the fingers; on removal of pressure the partly flattened material returned to a ball shape.

Another sample of the gel was milled without the addition of any other agent. A ball of the milled product was heated at 170–175° C. for five hours. There seemed to be little change after the first hour. The ball was quite firm and resilient.

*Example 9.*—This example illustrates the polymerization, by means of heat and air, of a product obtained by hydrolyzing a mixture of dimethyl mono-chlorosilane and butyl trichlorosilane.

Twenty-three parts of dimethyl mono chlorosilane and 12 parts of butyl trichlorosilane were mixed and the mixture was hydrolyzed. The product obtained was aerated at 160° C. for 3 hours then at 190° C. for 2 hours. The aeration was stopped just before gellation occurred. A portion of the product was dissolved in toluene. A film was poured on a glass plate and heated at 170° C. for 6 hours. A clear, hard film was obtained.

The remainder of the product was spread in a thin layer in a dish and heated at 160° C. for 2 hours. A firm gel was obtained which was easily milled into the shape of a ball. When the ball was heated at 120° C. for 4 hours it developed considerable resilience.

*Example 10.*—This example illustrates the polymerization, by means of heat and air, of a product obtained by hydrolyzing a mixture of monomethyl dichlorosilane and butyl silicon trichloride.

Twenty-eight and one-half parts of monomethyl di-chlorosilane and 12 parts of butyl silicon trichloride were mixed and hydrolyzed on cracked ice. A film of the product formed was heated at 170° C. for 2 hours. A hard brittle film was obtained.

Ten parts of the hydrolytic product was aerated at 160° C. The mixture gelled within 15 minutes. A sample of the gel was milled and formed into the shape of a ball. The ball was heated at 120° C. for 4 hours. A resilient product was obtained.

*Example 11.*—This example illustrates the polymerization, by means of heat and air, of hydrolyzed monopropyl di-chlorosilane.

Ten parts of the hydrolyzed product was aerated at 160° C. Gelation occurred within 15 minutes. A portion of the product was spread out on a glass plate and put in an oven at 120° C. for ½ hour. It was then milled and shaped into a ball. Further heating at 120° C. for two hours produced a resilient product.

*Example 12.*—This example illustrates the polymerization, by means of heat and air, of hydrolyzed monobenzyl dichlorosilane.

The hydrolyzed product was aerated for 5 hours at 160–170° C., then one hour at 200° C. and finally for one hour at 230–250° C. A very viscous material was obtained. A portion of it was dissolved in toluene and from this solution a film was put on a glass plate and heated at 200° C. for one-half hour. A clear, hard film was obtained. A second portion was aerated at 200–210° C. for 2½ hours. The gelled material obtained was milled with zinc oxide and formed into the shape of a ball. The ball was heated at 170° C. for 3 hours. At this point the ball was only moderately resilient.

*Example 13.*—This example illustrates the polymerization, by means of heat and air, of a cohydrolyzed mixture of monophenyl dichlorosilane and silicochloroform. Before hydrolysis the two chlorides were mixed in the molar ratio of monophenyl dichlorosilane:silicochloroform::2:1.

Ten parts of the hydrolyzed product gelled after air blowing for 5 minutes at 165° C. It was then spread out in a dish and placed in the oven at 120° C. for three hours. It was then milled and shaped into a ball. When the ball was heated at 140° C. for 2 hours it gave a resilient product.

*Example 14.*—This example illustrates the polymerization, by means of heat and air, of hydrolyzed diphenyl mono-chlorosilane.

The hydrolyzed product was aerated at 165° C. for 3 hours; then 165–200° C. for 1 hour; 1½ hours at 200–240° C., 2½ hours at 200–240° C., and finally 3 hours at 240° C. The product at this stage was quite viscous but still soluble in toluene. A film of a toluene solution of the above product was put on a glass plate. When the plate was heated 250–260° C. for ½ hour a hard, clear film was obtained.

*Example 15.*—This example illustrates the polymerization, by means of heat and air, of hydrolyzed dimethyl mono chlorosilane (dimethyl silicochloroform).

The hydrolyzed product was aerated for 2½ hours at 165° C. The temperature was raised to 185–190° C.; after 15 minutes at this temperature the sample gelled. A sample of the gel was milled, the milled product was rolled into a ball shape and placed in the oven at 120° C. for 3 hours. A very resilient product was obtained.

*Example 16.*—This example illustrates the polymerization, by means of heat and air, of hydrolyzed di-n-butyl mono chlorosilane (dibutyl silicochloroform).

The hydrolyzed product was heated and aerated as follows:

| Time | Temp., °C. |
|---|---|
| 2 hrs | 160. |
| ½ hr | 180–190. |
| ½ hr | 190–200. |
| 1¼ hrs | 210–220 gel formation. |

Shortly before the product gelled a sample was withdrawn and dissolved in toluene. When a film of the polymer was put on a glass plate and heated at 180–200° C. for ½ hour, a clear, hard film was obtained.

A portion of the sticky gel was spread on a watch glass and heated at 120° C. for 2 hours. The sample was then milled and shaped into a ball. Further heating at 120° C. for 3 hours gave a resilient product.

Having thus set forth my invention, I claim:

1. The method of preparing rubber-like materials which comprises hydrolyzing with water the halogen-only in a compound having the formula $R_ySiHX_{3-y}$, where R is a monovalent hydrocarbon radical, X is a halogen selected from the group consisting of chlorine, bromine and iodine, and $y$ is 1 to 2, and heating at a temperature of about 150°–250° C. the hydrolyzed product while blowing air therethrough until a polymerized product in substantial amount is obtained.

2. The method of preparing elastomeric materials which comprises heating at a temperature of about 150–250° C. a hydrolyzed halogen-only compound having the formula $R_ySiHX_{3-y}$, where R is a monovalent hydrocarbon radical, X is a halogen selected from the group consisting of chlorine, bromine, and iodine, and $y$ is 1 to 2, while blowing air therethrough until a polymerized product in substantial amount is obtained.

3. The method as set forth in claim 1 in which R is alkyl.

4. The method of preparing elastomeric materials which comprises heating at a temperature of about 150–250° C. a halogen-only hydrolyzed compound having the formula $R_ySiHX_{3-y}$, where R is a monovalent hydrocarbon radical, X is a halogen selected from the group consisting of chlorine, bromine and iodine, and $y$ is 1 to 2, with a hydrolyzed organo silicon halide having no hydrogen-silicon bond, while blowing air therethrough until a polymerized product in substantial amount is obtained.

5. The method as set forth in claim 4, in which R is alkyl, and in which the hydrolyzed organo silicon halide is an alkyl silicon halide.

6. The method as set forth in claim 2 which includes the step of baking the polymerized product.

7. The method as set forth in claim 4 which includes the step of baking the polymerized product.

8. The method of preparing elastomeric materials which comprises cohydrolyzing the halogen-only of a compound having the formula $R_ySiHX_{3-y}$, where R is a monovalent hydrocarbon radical, X is a halogen selected from the group consisting of chlorine, bromine, and iodine, and $y$ is 1 to 2, with a hydrolyzable organo silicon halide having no hydrogen-silicon bond, and heating at a temperature of about 150°–250° C. the cohydrolyzed product while blowing air therethrough until a polymerized product in substantial amount is obtained.

9. The method as set forth in claim 1, which includes the step of milling the polymerized product and baking the milled product.

10. The method of preparing rubber-like materials which comprises halogen-only hydrolyzing with water a compound having the formula $R_y SiHX_{3-y}$, where R is a monovalent hydrocarbon radical, X is a halogen selected from the group consisting of chlorine, bromine and iodine, and $y$ is 1 to 2, and heating at a temperature of from 150°–250° C. the hydrolyzed product while blowing oxygen therethrough until a polymerized product in substantial amount is obtained.

11. The method of preparing rubber-like materials which comprises halogen-only hydrolyzing with water a compound having the formula $R_y SiHX_{3-y}$, where R is a monovalent hydrocarbon radical, X is a halogen selected from the group consisting of chlorine, bromine and iodine, and $y$ is 1 to 2, and heating at a temperature of from 150°–250° C. the hydrolyzed product while blowing oxygen and an inert gaseous diluent therethrough until a polymerized product in substantial amount is obtained.

12. An air blown polymerization product of a halogen-only hydrolyzed compound having the formula $R_y SiHX_{3-y}$, where R is a monovalent hydrocarbon radical, X is a halogen selected from the group consisting of chlorine, bromine and iodine, and $y$ is 1 to 2 produced by the method of claim 2.

13. A polymerization product as set forth in claim 12 in which R is alkyl.

14. An air blown copolymerization product of a halogen-only hydrolyzed compound having the formula $R_y SiHX_{3-y}$, where R is a monovalent hydrocarbon radical, X is a halogen selected from the group consisting of chlorine, bromine and iodine, and $y$ is 1 to 2, with a halogen-only hydrolyzed organo silicon halide having no hydrogen-silicon bond, produced by the method of claim 2.

15. A baked air blown polymerization product as set forth in claim 12.

16. A milled air blown polymerization product as set forth in claim 12.

17. A baked air blown polymerization product as set forth in claim 14.

18. An air blown polymerization product of a halogen-only cohydrolyzed compound having the formula $R_y SiHX_{3-y}$, where R is a monovalent hydrocarbon radical, X is a halogen selected from the group consisting of chlorine, bromine and iodine and $y$ is 1 to 2, with a hydrolyzable organo silicon halide having no hydrogen-silicon bond, produced by the method of claim 2.

19. A baked, milled, air blown polymerization product as set forth in claim 12.

20. The method as set forth in claim 2 in which the hydrolyzed material treated is monomethyl and monoethyl dichlorosilanes.

21. The method o claim 2 in which the hydrolyzed material treated is monomethyl dichlorosilane.

22. The method of claim 2 in which the hydrolyzed material treated is monoethyl dichlorosilane.

23. The method of claim 2 in which the hydrolyzed material is monopropyl dichlorosilane.

24. The method of claim 2 in which the hydrolyzed material is monobutyl dichlorosilane.

CHARLES A. MacKENZIE.

REFERENCES CITED

The following references are of record in the file of this patent:

UNITED STATES PATENTS

| Number | Name | Date |
|---|---|---|
| 2,371,050 | Hyde | Mar. 6, 1945 |
| 2,377,689 | Hyde | June 5, 1945 |
| 2,386,259 | Norton | Oct. 9, 1945 |
| 2,386,466 | Hyde | Oct. 9, 1945 |
| 2,386,467 | Hyde | Oct. 9, 1945 |
| 2,397,727 | Daudt | Apr. 2, 1946 |
| 2,435,147 | McGregor et al. | Jan. 27, 1948 |

OTHER REFERENCES

Stock et al., Berichte Deut. Chem. Gesel, vol. 52, 1919, pages 695 to 699, 708, 713, 722 and 733.

Chemical & Engineering News, vol. 24, May 10, 1946, pages 1233 and 1234.